Aug. 19, 1952     J. W. PRATT ET AL     2,607,419
MACHINE FOR PREPARING UPPERS FOR LASTING
Filed Dec. 20, 1949     2 SHEETS—SHEET 1
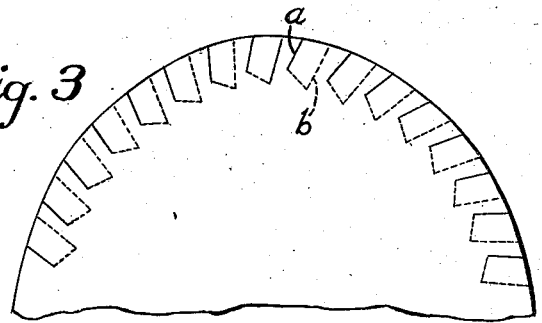
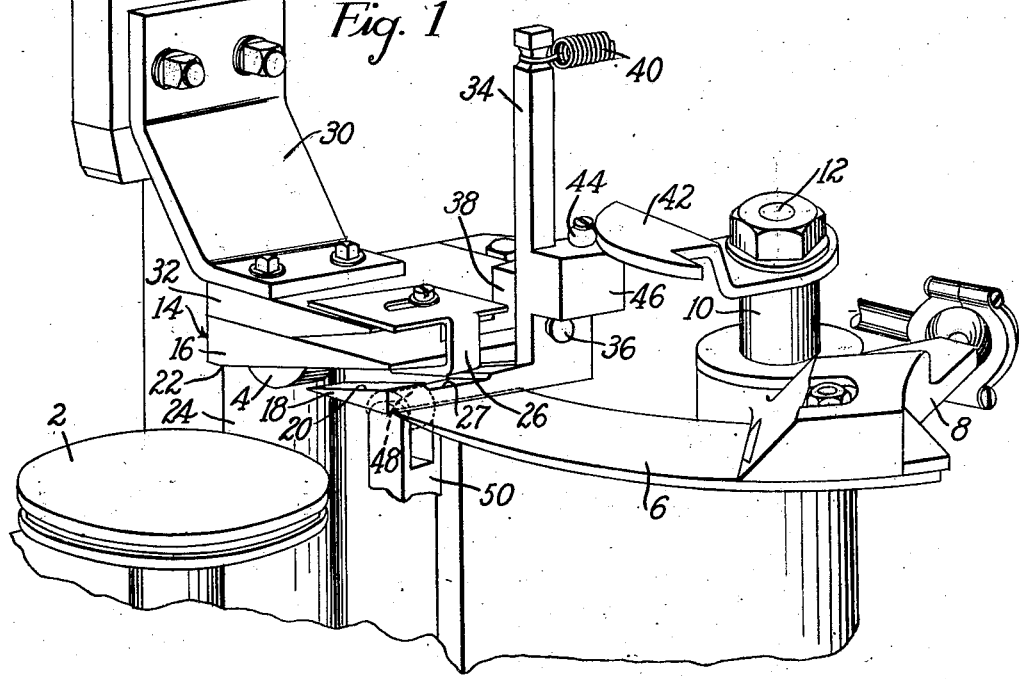
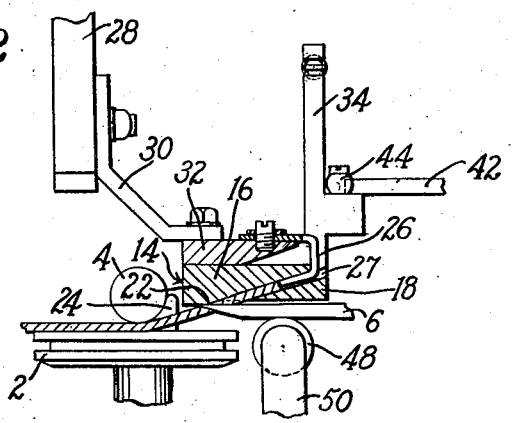
*Inventors*
John W. Pratt
Ernest H Simms
By their Attorney

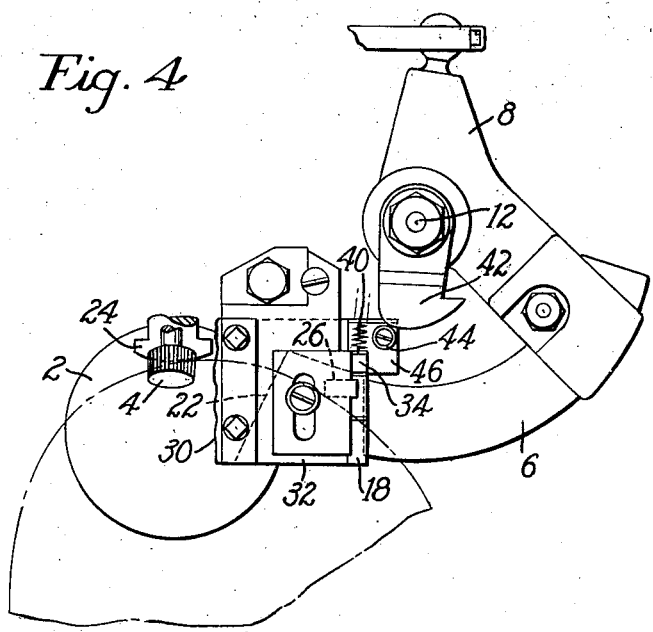

Patented Aug. 19, 1952

2,607,419

UNITED STATES PATENT OFFICE 2,607,419

MACHINE FOR PREPARING UPPERS FOR LASTING

John William Pratt and Ernest Harry Simms, Leicester, England, assignors to United Shoe Machinery Corporation, Flemington, N. J., a corporation of New Jersey Application December 20, 1949, Serial No. 134,070
In Great Britain January 12, 1949

5 Claims. (Cl. 164—50)

This invention relates to machines for use in the manufacture of shoes to prepare the uppers for the lasting operation, and more particularly to machines for forming slits in the margin of each upper, e. g., around its toe-end portion, to facilitate the proper lasting of its margin inwardly over an insole on a last. Such a machine is shown in United States Letters Patent No. 2,523,480, granted on September 26, 1950, on an application of J. W. Pratt. An immediate object of the invention is to improve the operation of the machine therein shown on some kinds of upper materials, and the invention is therefore herein shown as applied to that machine, but it will be understood that it is not thus limited in its applicability.

The above-mentioned machine is provided with an upper-slitting knife mounted for reciprocatory movements about an axis, and with a shear block having a shearing edge with which the knife cooperates to form the slits in the upper. The shear block has therein an upper-guiding slot in inclined relation to the path of movement of the knife, so that the knife cuts obliquely through the margin of the upper from one side thereof to the other side. In proper time relation to the operative movements of the knife the upper is fed intermittently in a direction lengthwise of its edge by rotary feeding means engaging portions thereof which have already been operated upon by the knife, the arrangement being such that the upper is thus fed in the same general direction in which the knife moves in forming the slits.

The construction above described has been used with consistently good results in operating on uppers of comparatively thick or stiff material. In operating, however, on uppers of comparatively thin or pliable material it has been found that, because of a tendency of the knife to displace the upper in the direction in which it is fed, the knife may sometimes fail to make a clean cut all the way through the upper. The present invention provides a construction which, by better control of the upper material at the time when each upper-slitting operation takes place, prevents any such faulty action of the knife. In the construction shown the desired result is accomplished by intermittently clamping and releasing the margin of the upper, the upper being thus clamped after each feeding movement prior to the action of the knife thereon. More particularly, as herein shown, the shear block is made in two parts which are separated by the above-mentioned upper-guiding slot and one of which is moved toward the other to clamp and hold the portion of the margin of the upper in the slot immediately prior to each upper-slitting operation. Since the portion thus clamped is the portion yet to be fed into the path of movement of the knife the upper is held securely against displacement by the knife when the knife acts thereon. Further to insure proper cooperation between the knife and the shear block, means is provided for preventing any springing of the knife away from the shear block, this means in the construction shown comprising a roll arranged to support the knife in a location under the shear block.

The novel features of the invention, including various novel details of construction and combinations of parts, will now be more particularly described with reference to the accompanying drawings and thereafter pointed out in the claims.

In the drawings,

Fig. 1 is a perspective view of a portion of the machine to which the invention is herein shown as applied, the parts being shown in their initial positions;

Fig. 2 is a view partly in front elevation and partly in section of a portion of the structure shown in Fig. 1, with the parts in the positions which they occupy when the upper-slitting knife is at the end of its operative movement;

Fig. 3 is a plan view showing in a flat condition the toe-end portion of an upper after it has been operated upon by the machine; and Fig. 4 is a plan view of parts shown in Fig. 1.

Except as modified for purposes of the present invention the machine may be assumed to be of substantially the same construction as shown and described in detail in the previously mentioned Letters Patent. It includes a circular work-supporting table 2 mounted to rotate about a vertical axis and a feed wheel 4 arranged to cooperate with the table to clamp the margin of the toe-end portion of the upper when the table has been raised by a treadle (not shown) from an initial inoperative position. By mechanism disclosed in the above-mentioned Letters Patent the table and the feed wheel are rotated intermittently to feed the upper step by step in a direction generally lengthwise of its edge. In the intervals between the intermittent feeding movements of the upper it is operated upon by a flat, arcuate upper-slitting knife 6 which is secured to an arm 8 fast on a sleeve 10 rotatable about a vertical stud 12 and to which reciprocatory movements are imparted by means shown in said Letters Patent. The knife is arranged to cooperate with a shear block 14 having an upper part 16 and a lower part 18 which are spaced apart to provide between them an upper-guiding slot 20 inclined to the path of movement of the knife to cause the knife to cut obliquely through the margin of the upper. Formed on the upper part 16 is a shearing edge 22 past which the cutting edge of the knife is moved. The upper is further positioned in proper relation to the knife by an adjustable edge gage 24 at the rear of the table 2 and another adjustable edge gage 26 on the shear block. In the construction shown a portion of the edge gage 26 extends into the upper-guiding slot 20, the lower part 18 of the shear block having therein a groove 27 to provide clearance for the gage. It will be evident that, except at the very beginning of the operation of the machine, the table 2 and the feed wheel 4 feed the upper by engaging portions of its margin already operated upon by the knife 6 and that in slitting the upper the knife moves in the same general direction in which the upper is fed.

For purposes of this invention the upper part 16 of the shear block 14 is secured firmly to the head casting 28 of the machine by a strut 30 between which and the part 16 is a spacing member 32. The lower part 18 of the shear block, moreover, is secured to an arm 34 which extends upwardly at the rear of the shear block and is pivotally mounted near its lower end on a horizontal pin 36 fast in a small block 38 welded to the upper part 16 of the shear block. Connected to the upper end of the arm 34 is a spring 40 which, by its action on the arm, tends to swing the lower part 18 of the shear block upwardly toward the upper part 16. Cooperating with the spring to control the lower part of the shear block is a cam 42 which is secured to the sleeve 10 and therefore swings with the knife-carrying arm 8, the cam engaging a roll 44 mounted on a lug 46 on the arm 34. The shape of the cam 42 is such that when the knife 6 is in its retracted position the lower part 18 of the shear block is in such relation to the upper part 16 that the margin of the upper is loosely positioned in the slot 20. When the knife receives its operative movement, however, the cam 42 by its movement causes the spring 40 to swing the lower part of the shear block upwardly until the margin of the upper in the slot 20 is clamped firmly between the two parts of the shear block. This clamping action takes place before the edge of the knife actually engages the upper, and since the portion of the upper thus clamped is the portion which is yet to be fed into the path of movement of the knife, the upper is held securely against any tendency of the knife to displace it in the direction of its feeding movement. Further to guard against any failure of the knife to make a clean cut through the upper, it is prevented from springing downwardly away from the shear block by a roll 48 engaging it in a location under the shear block and mounted on a member 50 fast on the head casting 28.

In the use of the machine constructed as described on the toe-end portion of a leather upper, the operator presents the toe end of the upper grain side uppermost over the table 2 with a portion of its margin in the upper-guiding slot 20 in the shear block 14 and with its edge in engagement with the two edge gages 24 and 26 which will have been previously adjusted to determine the depth of the slits in the upper and the directions in which they will extend inwardly from the edge of the upper. The upper is thus initially positioned in such relation to the shearing edge 22 of the shear block that the first slit will be formed at the left-hand side of the toe. Having thus presented the upper, the operator depresses the treadle (not shown) to raise the table 2, until the upper is clamped between the table and the feed wheel 4, and to start the power operation of the machine. Upon the starting of the machine the knife 6 is swung in its arcuate path toward the shearing edge 22 of the sheer block, the cam 42 swinging with the knife and causing the spring 40 to swing the lower part 18 of the shear block upwardly to clamp the upper against the upper part 16 just before the cutting edge of the knife engages the upper. Such clamping of the upper counteracts any tendency of the knife to displace it in the direction of its feeding movement. Further insurance that the knife will make a clean cut through the upper is afforded by the supporting engagement of the roll 48 with the knife under the shear block. As the knife is thereafter retracted to its initial position the cam 42 swings the lower part of the shear block downwardly to relieve the clamping pressure on the upper and thus to facilitate the next feeding movement imparted thereto by rotation of the feed wheel 4 and the table 2. Upon the completion of this feeding movement the upper-slitting movement of the knife and the clamping action of the shear block on the upper are repeated, the operations described continuing until the operator releases the treadle.

The toe end of the upper, after having been thus operated upon, appears as shown in Fig. 3. The slits formed by the knife 6 extend obliquely through the margin of the upper and terminate on the grain and flesh sides of the upper, respectively, in the lines $a$ and $b$.

Having described the invention, what we claim as new and desire to secure by Letters Patent of the United States is:

1. A machine for forming slits in the margin of an upper having, in combination, means for feeding the upper intermittently in a direction lengthwise of its edge by engagement with its margin, an upper-slitting knife, means for imparting to said knife reciprocatory movements in time relation to the feeding of the upper to form slits in portions of the margin of the upper thereafter engaged by said feeding means, a shear block arranged to cooperate with said knife to form the slits, said shear block comprising parts arranged to provide between them an upper-guiding slot inclined to the path of movement of the knife, said parts being relatively movable to clamp and release the margin of the upper, and means for effective relative movements of said parts to clamp the margin of the upper after each feeding movement preparatory to the upper-slitting operation and thereafter to release it to facilitate the next feeding movement thereof.

2. A machine for forming slits in the margin of an upper having, in combination, means for feeding the upper intermittently in a direction lengthwise of its edge, an upper-slitting knife, means for imparting to said knife reciprocatory movements in time relation to the feeding of the upper to form slits in the margin of the upper, a shear block arranged to cooperate with said knife to form the slits, said shear block comprising a fixed part and a movable part arranged to provide between them an upper-guiding slot inclined to the path of movement of the knife, and means including a cam movable in time relation to the knife to cause said movable part to clamp the margin of the upper against the fixed part after each feeding movement preparatory to the upper-slitting operation and thereafter to release it to facilitate the next feeding movement thereof.

3. A machine for forming slits in the margin of an upper having, in combination, means for feeding the upper intermittently in a direction lengthwise of its edge, an upper-slitting knife, means for imparting to said knife reciprocatory movements in time relation to the feeding of the upper to form slits in the margin of the upper, a shear block arranged to cooperate with said knife to form the slits, said shear block comprising a fixed part and a movable part arranged to provide between them an upper-guiding slot inclined to the path of movement of the knife, a spring tending to move said movable part toward the fixed part to clamp the margin of the upper, and means for holding said movable part in position to permit free movement of the upper along said slot in each upper-feeding operation and for releasing it to the action of the spring to cause it to clamp the upper in each upper-slitting operation.

4. A machine for forming slits in the margin of an upper having, in combination, means for feeding the upper intermittently in a direction lengthwise of its edge, an upper-slitting knife, means for imparting to said knife reciprocatory movements in time relation to the feeding of the upper to form slits in the margin of the upper, a shear block mounted adjacent to the path of movement of the knife and arranged to cooperate with the knife to form the slits, said shear block having an upper-guiding slot inclined to the path of movement of the knife, and means for engaging said knife on the opposite side thereof from the shear block in a location opposite to the shear block to prevent it from springing away from the shear block in the upper-slitting operation.

5. A machine for forming slits in the margin of an upper having, in combination, means for feeding the upper intermittently in a direction lengthwise of its edge, an upper-slitting knife, means for imparting to said knife reciprocatory movements in time relation to the feeding of the upper to form slits in the margin of the upper, a shear block mounted adjacent to the path of movement of the knife and arranged to cooperate with the knife to form the slits, said shear block having an upper-guiding slot inclined to the path of movement of the knife, and a roll for engaging said knife on the opposite side thereof from the shear block to prevent the knife from springing away from the shear block in the upper-slitting operation.

JOHN WILLIAM PRATT.
ERNEST HARRY SIMMS.

REFERENCES CITED

The following references are of record in the file of this patent:

UNITED STATES PATENTS

| Number | Name | Date |
|---|---|---|
| 685,991 | Knipe | Nov. 5, 1901 |
| 728,532 | Arnold | May 19, 1903 |
| 855,753 | Brewer | June 4, 1907 |
| 970,702 | Goddu | Sept. 20, 1910 |